(12) United States Patent
Kabus et al.

(10) Patent No.: US 11,208,983 B2
(45) Date of Patent: Dec. 28, 2021

(54) WIND TURBINE PITCH ACTUATOR MOUNTING STRUCTURE

(71) Applicant: Vestas Wind Systems A/S, Aarhus N. (DK)

(72) Inventors: Simon Kabus, Viborg (DK); Jacob Hviid Nielsen, Tjele (DK); Jesper Lykkegaard Neubauer, Hornslet (DK); Erik Garde, Skødstrup (DK); Lasse Køgs Andersen, Hjortshøj (DK); Frank Møller Hansen, Arden (DK)

(73) Assignee: Vestas Wind Systems A/S, Aarhus N. (DK)

( * ) Notice: Subject to any disclaimer, the term of this patent is extended or adjusted under 35 U.S.C. 154(b) by 713 days.

(21) Appl. No.: 16/068,793

(22) PCT Filed: Jan. 5, 2017

(86) PCT No.: PCT/DK2017/050001
§ 371 (c)(1),
(2) Date: Jul. 9, 2018

(87) PCT Pub. No.: WO2017/133740
PCT Pub. Date: Aug. 10, 2017

(65) Prior Publication Data
US 2021/0207574 A1 Jul. 8, 2021

(30) Foreign Application Priority Data
Feb. 4, 2016 (DK) .......................... PA 2016 70061

(51) Int. Cl.
F03D 1/06 (2006.01)
F03D 7/02 (2006.01)
F03D 80/70 (2016.01)

(52) U.S. Cl.
CPC ......... *F03D 1/0658* (2013.01); *F03D 7/0224* (2013.01); *F03D 80/70* (2016.05);
(Continued)

(58) Field of Classification Search
CPC ...... F03D 80/70; F03D 7/0224; F03D 1/0658; F05B 2270/604
See application file for complete search history.

(56) References Cited

U.S. PATENT DOCUMENTS

| 2010/0276932 | A1 | 11/2010 | Numajiri | |
| 2012/0063901 | A1* | 3/2012 | Matsuda | F03D 7/0224 416/156 |
| 2012/0189445 | A1 | 7/2012 | Bertolotti | |

FOREIGN PATENT DOCUMENTS

| CA | 2669956 C | 6/2012 |
| CN | 201092931 Y | 7/2008 |

(Continued)

OTHER PUBLICATIONS

China National Intellectual Property Administration, First Notification of Office Action in CN Application No. 201780009735.2, dated Jul. 12, 2019.
(Continued)

*Primary Examiner* — Richard A Edgar
(74) *Attorney, Agent, or Firm* — Wood Herron & Evans LLP

(57) ABSTRACT

Wind turbine pitch actuator mounting structure A mounting structure is described for attaching a pitch actuator to a hub of a wind turbine. The mounting structure has one or more legs each having a proximal end and a distal end, and a flexible intermediate portion between the proximal and distal ends. The mounting structure further comprises an actuator attachment portion for attaching to a wind turbine blade pitch actuator. The actuator attachment portion is arranged at the distal end(s) of the one or more legs. The
(Continued)

proximal end(s) of the one or more legs are configured for attachment to a wind turbine hub. The flexible intermediate portion(s) of the one or more legs are configured to flex in use to absorb loads acting on the pitch actuator. The mounting structure therefore allows the pitch actuator to pivot in a first plane by virtue of the flexible legs. The pitch actuator may be attached to the mounting structure via pivot bearings arranged to allow the pitch actuator to pivot in a second plane, substantially perpendicular to the first plane.

23 Claims, 5 Drawing Sheets

(52) U.S. Cl.
CPC ....... *F05B 2240/50* (2013.01); *F05B 2260/74* (2013.01); *F05B 2260/79* (2013.01); *F05B 2270/604* (2013.01)

(56) References Cited

FOREIGN PATENT DOCUMENTS

| CN | 101324220 A | 12/2008 |
| CN | 202228272 U | 5/2012 |
| CN | 102884315 A | 1/2013 |
| EP | 1995453 A1 | 11/2008 |
| JP | 2010203260 A | * 9/2010 |
| JP | 2010203260 A | 9/2010 |

OTHER PUBLICATIONS

European Patent Office, International Search Report and Written Opinion in PCT Application No. PCT/DK2017/050001, dated Apr. 24, 2017.
Danish Patent and Trademark Office, Search and Examination Report in PA 2016 70061, dated Aug. 16, 2016.
European Patent Office, Examination Report in EP Application No. 17701025.3, dated Feb. 20, 2020.

* cited by examiner

WIND TURBINE PITCH ACTUATOR MOUNTING STRUCTURE

TECHNICAL FIELD

The present invention relates generally to wind turbines having pitchable blades, and more specifically to a mounting structure for mounting a pitch actuator to a hub of a wind turbine and to a wind turbine comprising such a mounting structure.

BACKGROUND

Wind turbines capture and convert the power of the wind into electrical power to be supplied to an electrical grid. A typical wind turbine comprises a tower which forms the support structure for the turbine, a nacelle which contains the power generating components and a rotor, comprising a hub and a plurality of wind turbine blades, which is rotatably attached to the nacelle. When wind is incident on the wind turbine blades they are caused to rotate about a rotor axis. The mechanical energy of the rotating rotor is converted to electrical energy by a generator, which is housed in the nacelle along with various other components required for power generation.

To obtain efficient wind turbine operation, modern utility-scale wind turbines generally incorporate a pitch system for turning the blades about their longitudinal axes in order to control the angle of the blades with respect to the wind, i.e. to control the 'pitch angle' of the blades. The pitch system includes one or more linear pitch actuators, typically hydraulic actuators comprising a cylinder and a piston rod arranged to extend and retract from the cylinder to turn the blade.

In a standard pitch system, the cylinder of the pitch actuator is typically attached to the hub and the rod is typically attached to the blade. The cylinder is mounted to the hub such that it can pivot slightly in a first direction about a first pivot axis that is generally parallel to the pitch axis of the blade. This allows the cylinder to move slightly in a plane generally perpendicular to the pitch axis of the blade when the rod moves in and out of the cylinder to turn the blade.

The wind turbine blades are subject to high loads in use, and these loads result in forces acting upon the pitch actuator in a direction generally parallel to the pitch axis. In order to prevent such loads from bending or otherwise damaging the pitch actuator, it is known to mount the cylinder to the hub such that it can also pivot in a second direction, about a second pivot axis, perpendicular to the first pivot axis.

Accordingly, it is known to mount the cylinder of a pitch actuator to the hub so that the cylinder can pivot in two mutually orthogonal directions, about mutually orthogonal first and second pivot axes. This is achieved by the provision of first and second pivot bearings in the mounting arrangement between the cylinder and the hub.

The known mounting arrangements for the cylinder are relatively expensive due in part to the provision of multiple pivot bearings. The pivot bearings also incur wear over time and require servicing or replacement during the lifetime of the wind turbine.

Against this background, the present invention aims to provide an improved mounting structure for a pitch actuator.

SUMMARY OF THE INVENTION

According to a first aspect of the present invention, there is provided a wind turbine comprising a rotor comprising a hub and at least one rotor blade attached to the hub, the rotor being arranged to rotate about a rotor axis extending through the hub, and the at least one blade being arranged to turn relative to the hub about a pitch axis of the blade. The wind turbine further comprises at least one linear pitch actuator coupled to the hub at or near a first end of the pitch actuator and coupled to the blade at or near a second end of the pitch actuator. The pitch actuator is arranged to extend and contract to turn the blade about the pitch axis. The wind turbine further comprises a mounting structure for coupling the pitch actuator to the hub. The mounting structure comprises one or more legs projecting from a surface of the hub. The one or more legs each having a proximal end attached to or integral with the hub and a distal end spaced from the surface of the hub. The mounting structure further comprises an actuator attachment portion coupled to the pitch actuator at the distal end(s) of the one or more legs. The one or more legs include a flexible intermediate portion between the proximal and distal ends. The flexible intermediate portion is configured to enable the one or more legs to flex in use to facilitate pivoting movement of the pitch actuator in a first plane.

The flexible intermediate portion of the one or more legs enables the legs to bend resiliently in use. The mounting structure is therefore able to absorb loads acting on the pitch actuator. The one or more legs are configured to bend in preference to the cylinder and/or the rod. The one or more legs may therefore be configured to be more flexible than the pitch actuator. Accordingly, the actuator is prevented from bending, buckling or otherwise being damaged in use when under load. The actuator therefore remains straight and any seals remain intact. The actuator is therefore able to pitch the blades smoothly and continuously even when the blades are under significant loads.

The pitch actuator may comprise any suitable linear actuator, for example a hydraulic pitch actuator comprising a cylinder and a rod. The cylinder may be coupled to the hub and the rod may be coupled to the blade. The first end of the actuator may therefore be an end of the cylinder and the second end of the actuator may be an end of the rod. The rod may be arranged to extend and retract relative to the cylinder to effect turning of the blade about the pitch axis.

The pitch actuator may be coupled to a plate at the root end of the blade, for example to a stiffening plate of a pitch bearing. The second end of the pitch actuator may be coupled to the blade at a location radially offset from the pitch axis. Accordingly, linear motion of the pitch actuator is translated into rotational motion of the blade. The second end of the pitch actuator may be coupled to the blade via a spherical joint. The flexible legs of the mounting structure facilitate pivoting movement of the pitch actuator about the spherical joint in the first plane.

The pitch actuator may be pivotally connected to the actuator attachment portion of the mounting structure such that the pitch actuator can pivot in a second plane substantially perpendicular to the first plane.

The pitch actuator is therefore able to pivot at or near its first end about a pivot axis extending through the actuator attachment portion of the mounting structure. This pivot axis is located within the first plane and is generally parallel to the pitch axis of the blade when the legs of the mounting structure are straight, i.e. when the legs are not bent under load. When the legs are bent, the orientation of this pivot axis in the first plane will change slightly such that it is transverse but not strictly perpendicular to the pitch axis. Accordingly, the absolute orientation of the second plane will vary slightly when the legs are bending, whilst remaining substantially perpendicular to the first plane.

The pitch actuator will pivot in the second plane during extension/retraction of the pitch actuator. Typically the mounting structure allows pivoting of a few degrees in the second plane.

The first plane is preferably substantially parallel to a plane comprising the rotor axis and the pitch axis. However, when the actuator pivots in the second plane, it will be appreciated that the orientation of the first plane will vary by a few degrees with respect to the plane comprising the rotor axis and the pitch axis. All such orientations of the first plane are still considered to be 'substantially parallel' to the plane comprising the rotor axis and the pitch axis.

The mounting structure may comprise first and second legs arranged respectively on opposite sides of the pitch actuator and respectively on opposite sides of the first plane. In a preferred embodiment the two legs will then have substantially the same distance to the blade.

The actuator attachment portion may comprise at least one yoke bridging the respective distal ends of the first and second legs. The actuator may be pivotally connected to the at least one yoke.

The actuator attachment portion may comprise first and second mutually opposed yokes. The first and second mutually opposed yokes may be arranged respectively on opposite sides of the respective distal ends of the first and second legs. The or each yoke may be in the form of a plate. The plate may be attached to the legs by any suitable means, for example by screws or bolts.

The pitch actuator may be pivotally connected between the opposed first and second yokes of the mounting structure such that the pitch actuator can pivot in the second plane.

The pitch actuator may move between the first and second legs when the actuator pivots in the second plane. The pitch actuator may pivot towards the first leg or towards the second leg depending upon the direction of movement in the second plane.

The or each leg may extend substantially in the second plane when the or each leg is substantially straight, i.e. not bent under load.

The flexible intermediate portion preferably has a reduced thickness in comparison to a portion of the leg adjacent to the intermediate portion. The reduced thickness of the intermediate portion ensures the flexibility of the leg. Such reduced thickness may be e.g. less than 50% to a portion of the leg adjacent to the intermediate portion, such as less than 40% or less than 25%. The flexible intermediate portion of the or each leg may have a length in a direction generally parallel to the rotor axis, a thickness in a direction generally parallel to the pitch axis, and a width generally perpendicular to both the rotor axis and the pitch axis. The width of the intermediate portion may be greater than its thickness. This advantageously provides inherent flexibility in the or each leg, thereby facilitating pivoting movement of the pitch actuator in the first plane. The length of the intermediate portion of the or each leg may be greater than the width of the intermediate portion. This further increases the flexibility and resilience of the or each leg.

In other embodiments the flexibility of the leg may be achieved by other means or by other configurations of the leg. For example, the intermediate portion of the leg may be made from a different material to adjacent portions of the leg, for example it may be made from a more flexible material such as rubber. Alternatively, the intermediate portion of the leg could have a structure that promotes or increases flexibility such as a concertina structure, or the intermediate portion may comprise a spring.

The or each leg of the mounting structure may extend from a front surface of the hub in a direction generally parallel to the rotor axis. A mounting foot may be provided at a proximal end of the or each leg. The mounting foot may be attached to the front surface of the hub. In other embodiments the legs of the mounting structure may be integral with the hub.

In an embodiment, the mounting structure comprises first and second legs, wherein a proximal end and a distal end of said first leg defines a first leg direction in said second plane and a proximal end and a distal end of said second leg defines a second leg direction in said second plane, and wherein said first leg direction and said second leg direction are non-parallel with the distance between the distal ends being smaller than between the proximal ends. With such non-parallel structure a more stable construction is obtained, thereby avoiding the necessity for additional stiffening structure.

In a further embodiment pivoting of said pitch actuator in said second plane is restricted between where the central axis of said pitch actuator is parallel to said first leg direction and where it is parallel to said second leg direction. The distance between the pitch actuator and the individual distal ends are more or less constant, whereas the distance between the pitch actuator and the individual proximal ends is varied in the pivoting movement. With a restriction whereby the central axis of the pitch actuator is kept within these limits, the stable construction as mentioned above is further ensured In a preferred embodiment, each of said one or more legs is an integral unit. 'Integral unit' meaning that it is a casted and/or machined single unit.

For the avoidance of doubt, the front surface of the hub is the surface of the hub that is typically covered by a nose cone, i.e. it is on the opposite side of the hub to the nacelle that typically houses the generator. The actuator attachment portion of the mounting structure is therefore spaced apart from the front surface of the hub.

The actuator may extend through an aperture in the front face of the hub such that the first end of the actuator is provided outside the hub and the second end of the actuator is provided inside the hub. The mounting structure and the second end of the actuator may be located within a region substantially enclosed by a nose cone attached to the front of the hub. The nose cone may be removed to access the pitch actuators for servicing or replacement should this be required. The nose cone enhances the aesthetics of the wind turbine and protects the mounting structures and projecting parts of the pitch actuators from exposure to climatic conditions and damage in use.

According to a second aspect of the present invention, there is provided a mounting structure for attaching a pitch actuator to a hub of a wind turbine. The mounting structure has one or more legs each having a proximal end, a distal end, and a flexible intermediate portion between the proximal and distal ends. The mounting structure further comprises an actuator attachment portion for attaching to a wind turbine blade pitch actuator. The actuator attachment portion is arranged at the distal end(s) of the one or more legs. The proximal end(s) of the one or more legs are configured for attachment to a wind turbine hub. The intermediate portion(s) of the one or more legs are configured to flex in use to absorb loads acting on the pitch actuator.

Optional features described above in relation to the first aspect and in the dependent claims are equally applicable to the second aspect. Repetition of such features is avoided purely for reasons of conciseness.

BRIEF DESCRIPTION OF THE DRAWINGS

One or more embodiments of the invention will now be described, by way of example only, with reference to the accompanying drawings, in which.

DETAILED DESCRIPTION

Figure 1:
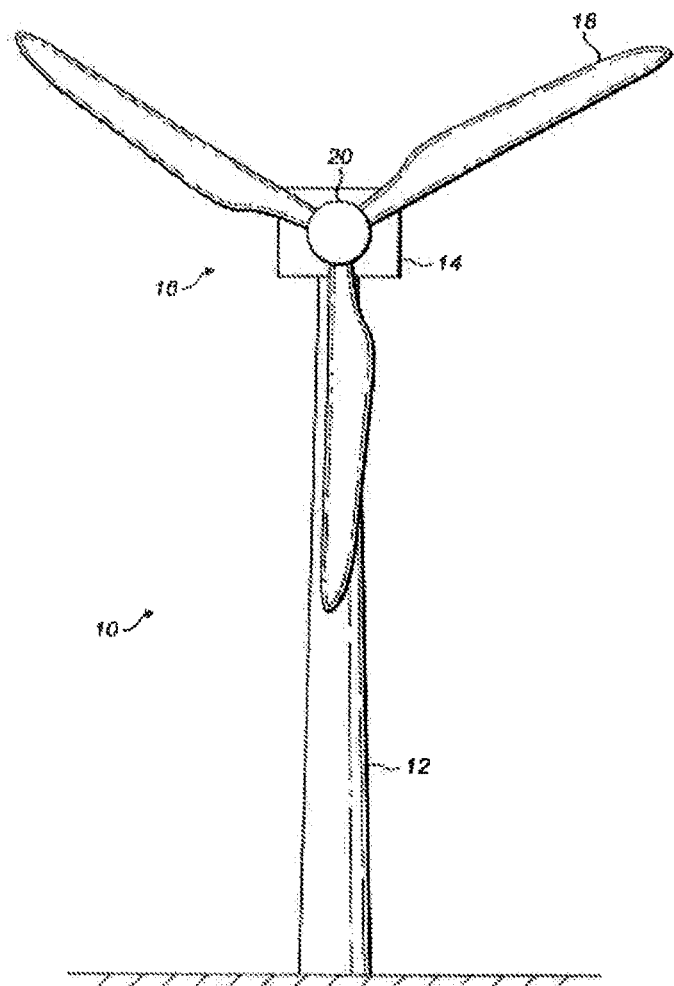
FIG. 1 shows a wind turbine according to an embodiment of the present invention.

FIG. 1 shows a wind turbine 10 according to an embodiment of the present invention. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18.

Figure 2:
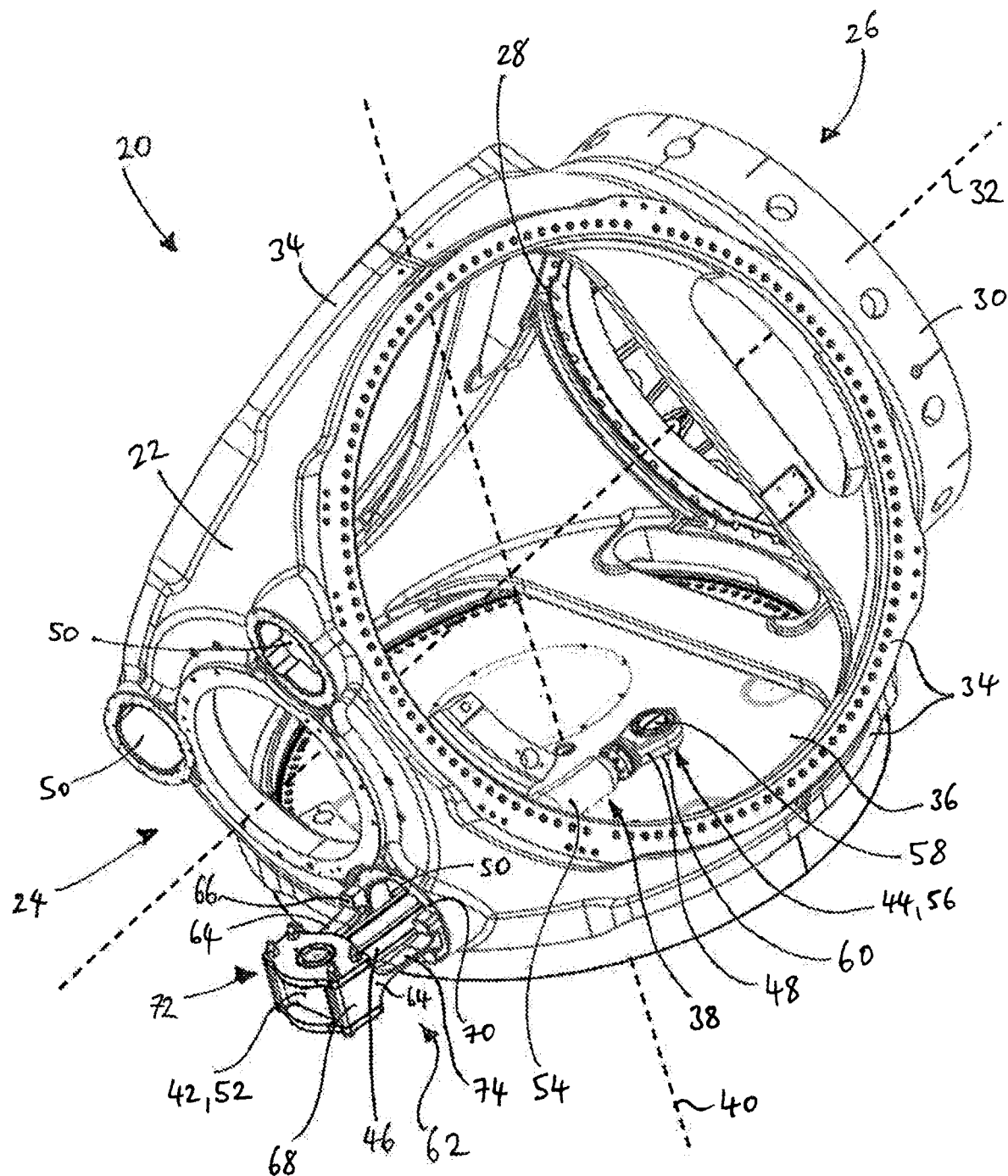
FIG. 2 is a perspective view of a hub of the wind turbine of FIG. 1, in which a linear pitch actuator is shown connected to the hub by means of a mounting structure according to an embodiment of the present invention.

Referring now to FIG. 2, the hub 20 is shown in more detail. The hub 20 comprises a hollow shell 22, which in this example is formed as a single casting of steel. The shell 22 comprises a front face 24 and a rear face 26. The rear face 26 includes a main shaft flange 28, which is adapted to be connected to a main shaft (not shown) of the wind turbine 10. The hub 20 is arranged to rotate about a rotor axis 32, which extends through the respective centres of the front and rear faces 24, 26 of the shell 22.

The shell 22 of the hub 20 includes three annular blade flanges 34, each being adapted for connection to a respective wind turbine blade 18, via a respective pitch bearing (not shown). A plate 36 is attached to each pitch bearing. The plate 36 may function as a stiffening plate.

A linear pitch actuator 38 is shown in FIG. 2 for turning a respective blade 18 about a pitch axis 40. A first end 42 of the pitch actuator 38 is mounted to the hub 20, whilst a second end 44 of the pitch actuator 38 is connected to the blade 18. For ease of illustration, only a single pitch actuator 38 is shown in FIG. 2. However, in practice three such pitch actuators 38 are provided—one actuator 38 being associated with each blade 18.

The pitch actuator 38 in this example is a hydraulic actuator comprising a cylinder 46 and a rod 48. The cylinder 46 extends through an aperture 50 defined in the front face 24 of the hub shell 22 such that a first end 52 of the cylinder 46 is located outside the shell 22 and a second end 54 of the cylinder 46 is located inside the shell 22. Three such apertures 50 are shown in FIG. 2, one for each pitch actuator 38. The rod 48 includes a first end (not visible) that is located inside the cylinder 46 and a second end 56 that is located outside the cylinder 46. The rod 48 is slidable within the cylinder 46 to vary the linear extension of the second end 56 of the rod 48 relative to the second end 54 of the cylinder 46. The second end 56 of the rod 48 is mounted to the plate 36 via a ball joint 58 at a mounting location 60 that is radially offset from the pitch axis 40. Accordingly, the linear extension and retraction of the rod 48 relative to the cylinder 46 is translated into rotational movement of the blade 18 about the pitch axis 40.

The first end 52 of the cylinder 46 is fixed to the hub 20 via a pitch actuator mounting structure 62. The mounting structure 62 comprises two legs 64 that project from the front surface 24 of the hub shell 22 in a direction generally parallel to the rotor axis 32. Each leg 64 has a proximal end 66 and a distal end 68. The proximal ends 66 of the legs 64 are attached to a flange 70 surrounding the aperture 50 through which the cylinder 46 extends. The distal ends 68 of the legs 64 are, accordingly, spaced from the front surface 24 of the hub 20.

As will be described in more detail later, the first end 52 of the cylinder 46 is pivotally connected to an actuator attachment portion 72 of the mounting structure 62 at the distal ends 68 of the legs 64. Whilst only a single mounting structure 62 is shown in FIG. 2, it will be appreciated that each pitch actuator 38 is mounted to the hub 20 via a respective mounting structure 62. The mounting structure 62 will now be described in further detail with reference to FIG. 3, which shows an isolated view of the mounting structure 62.

Figure 3:
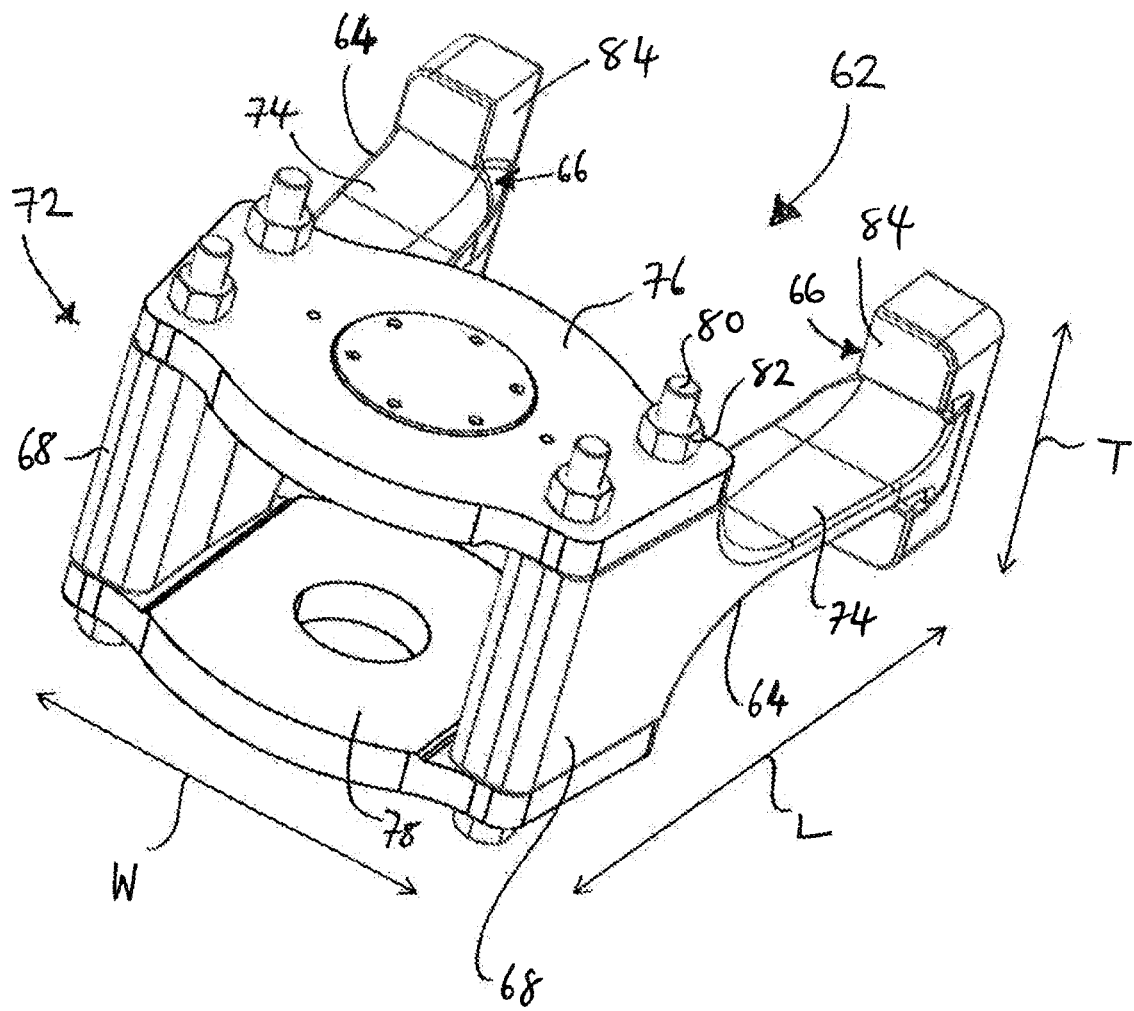
FIG. 3 is an isolated perspective view of the mounting structure shown in FIG. 2.

Referring to FIG. 3, the legs 64 of the mounting structure 62 have a length parallel to the arrow L, a width parallel to the arrow W, and a thickness parallel to the arrow T. The legs 64 each include a flexible intermediate portion 74 between the proximal and distal ends 66, 68. The flexible intermediate portion 74 has a reduced thickness in comparison to the thickness of the proximal and distal ends 66, 68 of the leg 64. The width of the intermediate portion 74 is greater than its thickness, whilst the length of the intermediate portion 74 is greater than its width. This configuration, and in particular the reduced thickness, allows the intermediate portion 74 to flex (e.g. bend resiliently) in use, as will be described in further detail later.

Referring still to FIG. 3, the actuator attachment portion 72 of the mounting structure 62 comprises first and second mutually opposed yoke plates 76, 78. The yoke plates 76 bridge the distal ends 68 of the legs 64 of the mounting structure 62 and are arranged respectively on opposite sides of the first and second legs 64. The yoke plates 76, 78 are attached to the legs 64 by a plurality of bolts 80, which extend through aligned sets of holes (not shown) in the distal ends 68 of the legs 64 and in the yoke plates 76, 78. A nut 82 is provided on each bolt 80 to clamp the assembly together. The proximal ends 66 of the legs 64 each include a mounting foot 84 via which the mounting structure 62 is bolted to the front face 24 of the hub 20. The legs 64, including the mounting feet 84, and the yoke plates 76, 78 are all made from steel in this example.

Figure 4:
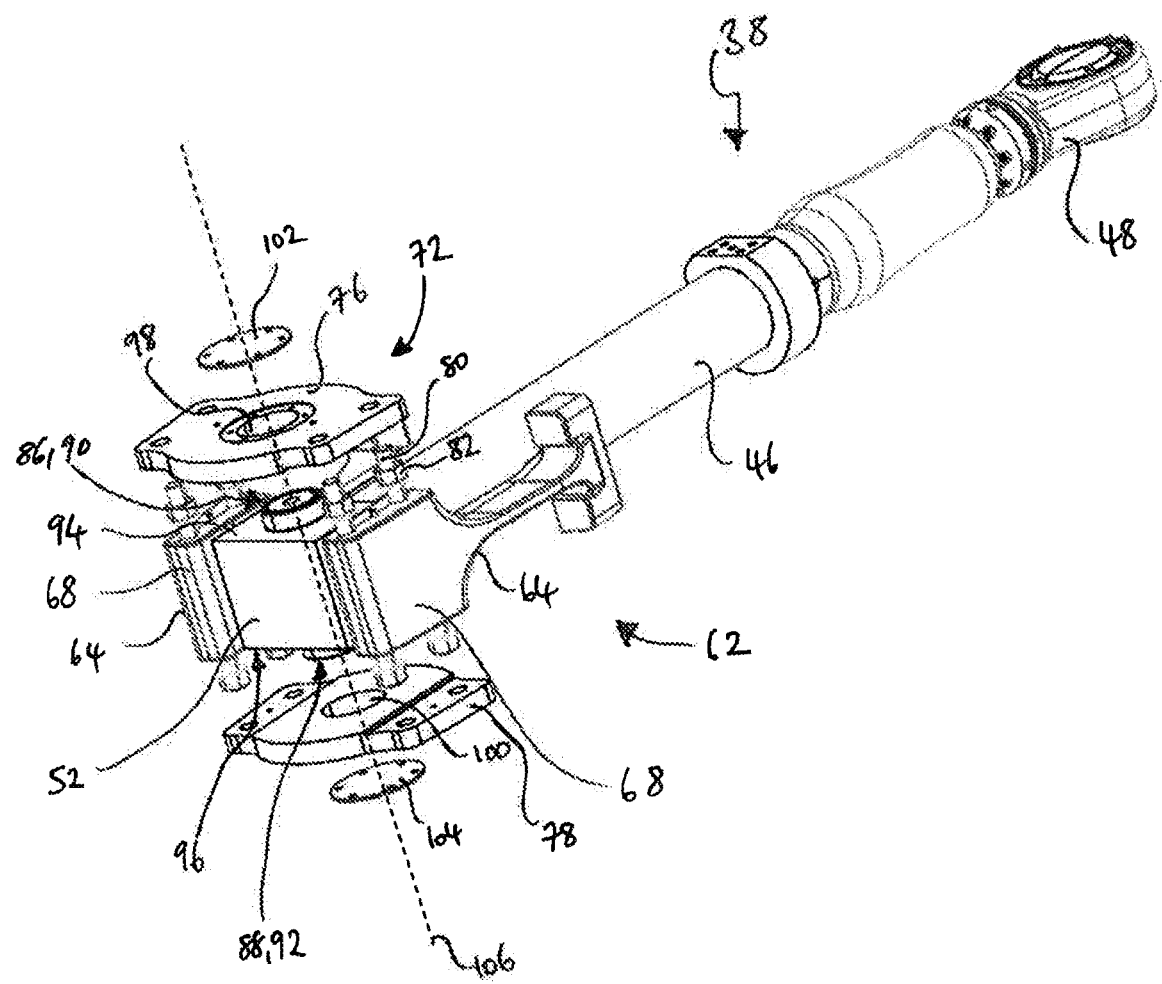
FIG. 4 is a perspective view of the pitch actuator and mounting structure shown in FIG. 2, in which the mounting structure is shown in an exploded form.

Referring now to FIG. 4, this shows the pitch actuator 38 and mounting structure 62 in isolation, with the actuator attachment portion 72 shown in exploded form. The first end 52 of the cylinder 46 is of substantially square cross section, and is arranged between the respective distal ends 68 of the first and second legs 64. First and second pivot pins 86, 88, each comprising an annular pivot bearing 90, 92, protrude respectively from upper and lower surfaces 94, 96 of the first end 52 of the cylinder 46. The pivot pins 86, 88 and bearings 90, 92 are received within respective circular apertures 98, 100 provided in the first and second yoke plates 76, 78 when the assembly is clamped together by the nuts 82 and bolts 80. Cover plates 102, 104 are secured over the circular apertures 98, 100 to prevent dust and moisture ingress whilst facilitating easy access to the pivot bearings 90, 92 for future maintenance or replacement.

The first end 52 of the cylinder 46 is therefore pivotally connected to the actuator attachment portion 72 of the mounting structure 62 via the pivot pins 86, 88 and pivot bearings 90, 92. This arrangement allows the pitch actuator 38 to pivot slightly in use (e.g. by a few degrees) about the pivot axis 106 indicated in FIG. 4 between the first and second legs 64 when the rod 48 is extended or retracted relative to the cylinder 46.

In use, the wind turbine blades 18 are subject to significant loads, including loads acting both parallel and perpendicular to the pitch axes 40 (shown in FIG. 2) of the blades 18. The mounting structure 62 is configured to absorb and accommodate these loads to prevent damage to the pitch actuator 38, i.e. to prevent the loads from causing the pitch actuator 38 to bend or buckle in use, as will now be described with reference to FIGS. 5a and 5b.

Figure 5A:
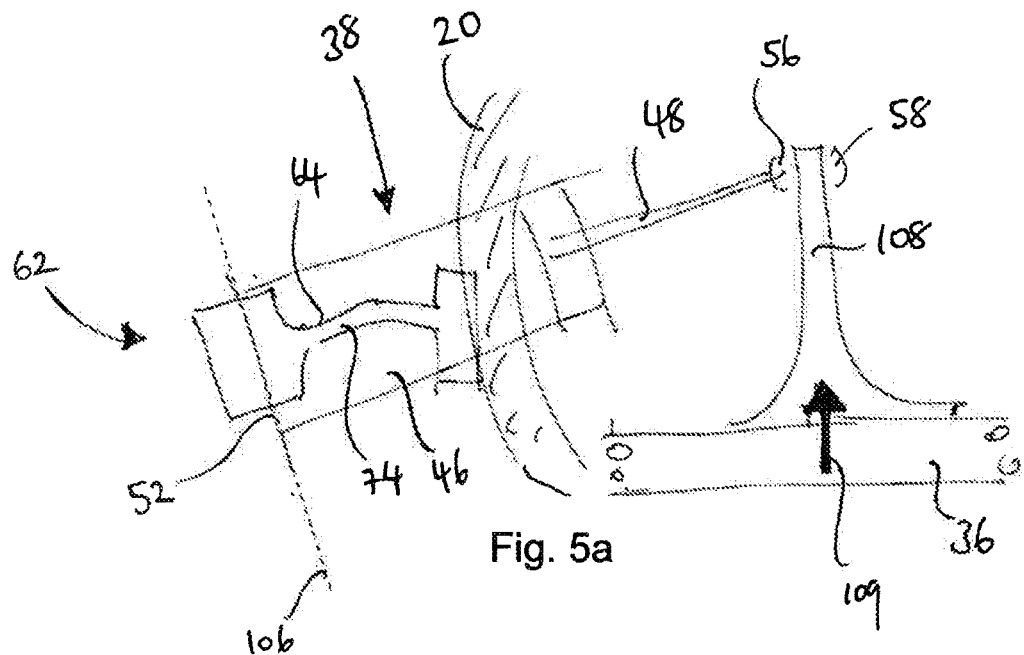
FIGS. 5a and 5b are schematic views illustrating the mounting structure flexing in use when under load to facilitate pivoting of the pitch actuator.

Referring to FIG. 5a, this is a schematic side view of the pitch actuator 38 described above. The first end 52 of the cylinder 46 is mounted to the hub 20 via the flexible mounting structure 62 described above, whilst the second end 56 of the rod 48 is connected to the plate 36 via a mounting post 108 and the ball joint 58 referred to previously. The upward vertical arrow 109 shown in FIG. 5a indicates a force acting along the pitch axis 40 (shown in FIG. 2) of the blade in a direction towards the root of the blade. This force causes the plate 36 to move slightly in the direction of the arrow 109, which in turn causes the flexible intermediate portions 74 of the legs 64 of the mounting structure 62 to flex (i.e. bend) slightly in an opposition direction to the force (i.e. downwardly as shown). This results in the pitch actuator 38 pivoting slightly about the ball joint 58 in a downward direction as shown in the orientation of FIG. 5a.

Figure 5B:
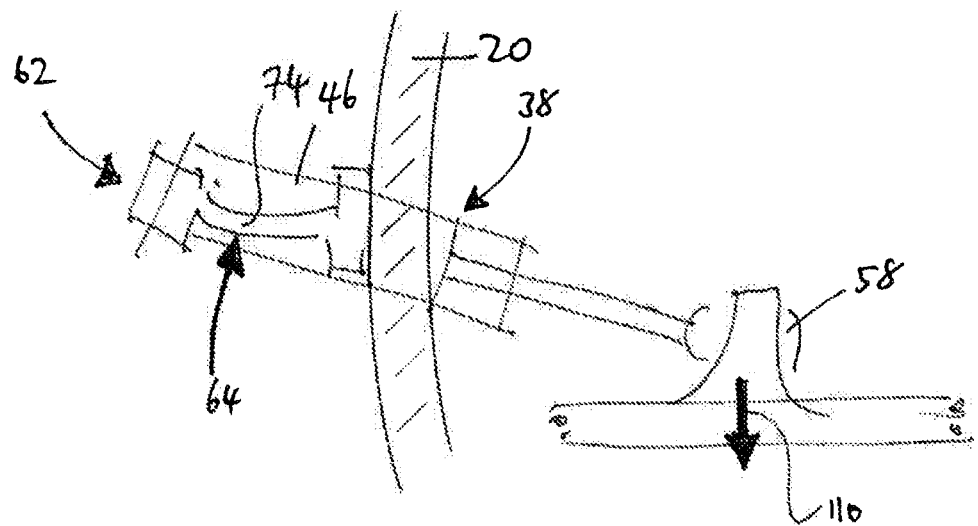

Referring now to FIG. 5b, the downward vertical arrow 110 indicates a force acting along the pitch axis 40 (shown in FIG. 2) of the blade in a direction away from the root of the blade. This force causes the plate 36 to move slightly in the direction of the arrow 110, which in turn causes the flexible intermediate portions 74 of the legs 64 to flex (i.e. bend) slightly in an opposite direction to the force, i.e. in an upwardly direction as shown. This results in the pitch actuator 38 pivoting slightly about the ball joint 58 in an upward direction as shown in the orientation of FIG. 5b. The flexible legs 64 are resiliently deformable and hence revert to a substantially straight configuration when not under load.

Relative terms such as 'upwards' and 'downwards' are used for convenience in the above paragraphs to refer to the directions as shown in the figures and are not intended to be limiting. It should be appreciated that, in reality, the hub is rotating and so the relevant directions are not necessarily upwards and downwards. It should also be appreciated that the flexing of the legs 64 illustrated in FIGS. 5a and 5b is highly exaggerated; in reality the extent of flexing would be more subtle.

The flexible legs 64 of the cylinder mounting structures 62 absorb loads acting on the pitch actuators 38 by flexing in use. The pitch actuators 38 are therefore able to pivot in use in a first plane about the ball joint 58. The first plane is the plane of the page comprising FIGS. 5a and 5b, and it will be appreciated by referring also to FIG. 2, that this first plane is substantially parallel to the plane comprising the rotor axis 32 and the pitch axis 40 of the relevant blade 18.

The mounting structure 62 provides a flexible suspension mounting for the cylinder 46. The flexible intermediate portions 74 of the legs 64 are designed to be more flexible than the actuator 38 so that they bend in preference to the actuator 38. The actuator 38 is therefore able to remain straight and perform its function without damage even when the blade 18 is subject to extreme loads.

Referring again to FIG. 5a, this figure also shows the pivot axis 106 described above and shown in FIG. 4. The actuator 38 remains free to pivot about this axis 106 during flexing of the legs 64, and it will be appreciated that the actuator 38 pivots about this axis 106 in a second plane substantially perpendicular to the first plane, i.e. substantially perpendicular to the plane of the page comprising FIG. 5a. It will also be appreciated, with reference to FIG. 2, that this second plane is substantially perpendicular to the plane comprising both the rotor axis 32 and the pitch axis 40 of the relevant blade 18.

Accordingly, the mounting structure 62 allows the pitch actuator 38 to pivot in a first plane by virtue of the flexible legs 64, and in a second plane substantially perpendicular to the first plane by virtue of the pivoting connection between the cylinder 46 and the actuator attachment portion 72. The flexible legs 64 of the mounting structure 62 therefore affords an additional degree of freedom to the pitch actuator 38 without the need for additional pivot bearings, thus reducing the cost and the maintenance requirements for the actuator mount 62 in comparison to prior art arrangements including two sets of pivot bearings.

Many modifications may be made to the above examples without departing from the scope of the invention as defined in the accompanying claims. For example, in other embodiments the flexibility of the legs 64 may be achieved by other means or by other configurations of the legs 64. For example, the intermediate portions 74 of the legs 64 may be made from a different material to adjacent portions of the leg 64, for example it may be made from a more flexible material such as rubber. Alternatively, the intermediate portion 74 of the leg 64 could have a structure that promotes or increases flexibility such as a concertina structure, or the intermediate portion 74 may comprise a spring. The mounting structure 62 in the above examples is bolted to the hub 20. However, in other embodiments the mounting structure 62 or parts of the mounting structure 62 may be integral with the hub 20.

The invention claimed is:

1. A wind turbine comprising:
   a rotor comprising a hub and at least one rotor blade attached to the hub, the rotor being arranged to rotate about a rotor axis extending through the hub, and the at least one blade being arranged to turn relative to the hub about a pitch axis of the blade,
   at least one linear pitch actuator coupled to the hub at or near a first end of the pitch actuator and coupled to the blade at or near a second end of the pitch actuator, the pitch actuator being arranged to extend and contract to turn the blade about the pitch axis; and
   a mounting structure for coupling the pitch actuator to the hub, the mounting structure comprising one or more legs projecting from a surface of the hub, the one or more legs each having a proximal end attached to or integral with the hub and a distal end spaced from the surface of the hub, and the mounting structure further comprising an actuator attachment portion coupled to the pitch actuator at the distal end(s) of the one or more legs,
   wherein the one or more legs each include a flexible intermediate portion between the proximal and distal ends, the flexible intermediate portion being configured to enable the one or more legs to flex in use to facilitate pivoting movement of the pitch actuator in a first plane, wherein the one or more legs comprises first and second legs, and wherein the actuator attachment portion includes a yoke that bridges the respective distal ends of the first and second legs and the actuator is pivotally connected to the yoke between the first and second legs and in the first plane.

2. The wind turbine of claim 1, wherein the flexible intermediate portion has a reduced thickness in comparison to a portion of the leg adjacent to the intermediate portion.

3. The wind turbine of claim 1, wherein the flexible intermediate portion has a length in a direction generally parallel to the rotor axis, a thickness in a direction generally parallel to the pitch axis, and a width generally perpendicular to both the rotor axis and the pitch axis, wherein the width of the intermediate portion is greater than its thickness.

4. The wind turbine of claim 3, wherein the length of the flexible intermediate portion is greater than its width.

5. The wind turbine of claim 1, wherein the first plane is substantially parallel to a plane comprising the rotor axis and the pitch axis.

6. The wind turbine of claim 1, wherein the pitch actuator is pivotally connected to the yoke such that the pitch actuator can pivot in a second plane substantially perpendicular to the first plane.

7. The wind turbine of claim 1, wherein the first and second legs are arranged respectively on opposite sides of the pitch actuator and respectively on opposite sides of the first plane.

8. The wind turbine of claim 7, wherein the yoke comprises first and second mutually-opposed yokes arranged respectively on opposite sides of the respective distal ends of the first and second legs.

9. The wind turbine of claim 8, wherein the pitch actuator is pivotally connected between the opposed first and second yokes of the mounting structure such that the pitch actuator can pivot in a second plane substantially perpendicular to the first plane.

10. The wind turbine of claim 1, wherein each leg of the mounting structure extends from a front surface of the hub in a direction generally parallel to the rotor axis.

11. The wind turbine of claim 1, wherein the second end of the pitch actuator is coupled to the blade at a location radially offset from the pitch axis.

12. The wind turbine of claim 1, wherein the second end of the pitch actuator is coupled to the blade via a spherical joint.

13. The wind turbine of claim 12, wherein the legs of the mounting structure facilitate pivoting movement of the pitch actuator about the spherical joint in the first plane.

14. The wind turbine of claim 1, wherein the pitch actuator comprises a cylinder that is coupled to the hub and a rod that is coupled to the blade, wherein the rod is arranged to extend and retract relative to the cylinder to effect turning of the blade about the pitch axis.

15. The wind turbine of claim 1, wherein a proximal end and a distal end of said first leg defines a first leg direction in a second plane substantially perpendicular to the first plane and a proximal end and a distal end of said second leg defines a second leg direction in said second plane, and wherein said first leg direction and said second leg direction are non-parallel with the distance between the distal ends being smaller than between the proximal ends.

16. The wind turbine of claim 15, wherein pivoting of said pitch actuator in said second plane is restricted between where the central axis of said pitch actuator is parallel to said first leg direction and where it is parallel to said second leg direction.

17. The wind turbine of claim 1, wherein each of said one or more legs is an integral unit.

18. The wind turbine of claim 1, wherein said one or more legs are made in steel.

19. The wind turbine of claim 1, wherein the intermediate portion of the leg is made from a different material to adjacent portions of the leg.

20. The wind turbine of claim 1, wherein the flexible intermediate portion has a thickness of less than 50% to a portion of the leg adjacent to the intermediate portion.

21. A mounting structure for attaching a pitch actuator to a hub of a wind turbine, the mounting structure having first and second legs each having a proximal end and a distal end, and a flexible intermediate portion between the proximal and distal ends, the mounting structure further comprising an actuator attachment portion for attaching to a wind turbine blade pitch actuator, the actuator attachment portion including a yoke that bridges the respective distal ends of the first and second legs to which the actuator is configured to be pivotally connected between the first and second legs in a first plane, and the proximal ends of the first and second legs being configured for attachment to a wind turbine hub, wherein the flexible intermediate portions of the first and second legs are configured to flex in use in the first plane to absorb loads acting on the pitch actuator.

22. A wind turbine comprising:

a rotor comprising a hub and at least one rotor blade attached to the hub, the rotor being arranged to rotate about a rotor axis extending through the hub, and the at least one blade being arranged to turn relative to the hub about a pitch axis of the blade, at least one linear pitch actuator coupled to the hub at or near a first end of the pitch actuator and coupled to the blade at or near a second end of the pitch actuator, the pitch actuator being arranged to extend and contract to turn the blade about the pitch axis; and a mounting structure for coupling the pitch actuator to the hub, the mounting structure comprising one or more legs projecting from a surface of the hub, the one or more legs each having a proximal end attached to or integral with the hub and a distal end spaced from the surface of the hub, and the mounting structure further comprising an actuator attachment portion coupled to the pitch actuator at the distal end(s) of the one or more legs, wherein the one or more legs each include a flexible intermediate portion between the proximal and distal ends, the flexible intermediate portion being configured to enable the one or more legs to flex in use to facilitate pivoting movement of the pitch actuator in a first plane, wherein the one or more legs comprises first and second legs, wherein a proximal end and a distal end of said first leg defines a first leg direction in a second plane substantially perpendicular to the first plane and a proximal end and a distal end of said second leg defines a second leg direction in said second plane, and wherein said first leg direction and said second leg direction are non-parallel with the distance between the distal ends being smaller than between the proximal ends.

23. A wind turbine comprising:
a rotor comprising a hub and at least one rotor blade attached to the hub, the rotor being arranged to rotate about a rotor axis extending through the hub, and the at least one blade being arranged to turn relative to the hub about a pitch axis of the blade,
at least one linear pitch actuator coupled to the hub at or near a first end of the pitch actuator and coupled to the blade at or near a second end of the pitch actuator, the pitch actuator being arranged to extend and contract to turn the blade about the pitch axis; and
a mounting structure for coupling the pitch actuator to the hub, the mounting structure comprising one or more legs projecting from a surface of the hub, the one or more legs each having a proximal end attached to or integral with the hub and a distal end spaced from the surface of the hub, and the mounting structure further comprising an actuator attachment portion coupled to the pitch actuator at the distal end(s) of the one or more legs,
wherein the one or more legs each include a flexible intermediate portion between the proximal and distal ends, the flexible intermediate portion being configured to enable the one or more legs to flex in use to facilitate pivoting movement of the pitch actuator in a first plane, and
wherein the one or more legs comprises first and second legs arranged respectively on opposite sides of the pitch actuator and respectively on opposite sides of the first plane.

* * * * *